US000001016H

United States Statutory Invention Registration [19]

[11] Reg. Number: H1016

Hatakeyama et al.

[43] Published: Jan. 7, 1992

[54] SILVER HALIDE PHOTOSENSITIVE MATERIAL

[75] Inventors: Akira Hatakeyama; Tomokazu Yasuda; Takashi Naoi; Shigetoshi Ono, all of Kanagawa, Japan

[73] Assignee: Fuji Photo Film Co., Ltd., Minami-ashigara, Japan

[21] Appl. No.: 603,507

[22] Filed: Oct. 26, 1990

[30] Foreign Application Priority Data

Oct. 27, 1989 [JP] Japan ..... 1-281243

[51] Int. Cl.[5] ..... G03C 1/76; G03C 1/005

[52] U.S. Cl. ..... 430/535; 430/533; 430/534; 430/537; 430/627

[58] Field of Search ..... 430/533, 534, 537, 627, 430/535

[56] References Cited

U.S. PATENT DOCUMENTS

| | | | |
|---|---|---|---|
| 4,213,783 | 7/1980 | Cook | 430/533 |
| 4,495,273 | 1/1985 | Pannocchia | 430/534 |
| 4,699,869 | 10/1987 | Bayless et al. | 430/534 |
| 4,714,671 | 12/1987 | Helling et al. | 430/627 |
| 4,933,267 | 6/1990 | Ishigaki et al. | 430/533 |
| 4,977,071 | 12/1990 | Kanetake et al. | 430/534 |

*Primary Examiner*—Robert L. Stoll
*Assistant Examiner*—C. Harris
*Attorney, Agent, or Firm*—Sughrue, Mion, Zinn, Macpeak & Seas

[57] ABSTRACT

A silver halide photosensitive material is disclosed, comprising a polyester film support having thereon at least one hydrophilic colloid layer, at least one layer of which is a silver halide emulsion layer and at least one layer of which is a polymer latex-containing hydrophilic colloid layer, said polyester film support having coated on each side thereof a vinylidene chloride copolymer having a weight average molecular weight not more than 45,000, said vinylidene chloride copolymer being a core/shell type latex, said core part containing at least one of each type of repeating unit represented by formulae (I) and )II) and the said shell part containing at least one of each type of repeating unit represented the formulae (I), (III) and (IV):

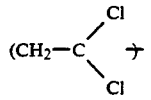

(I)

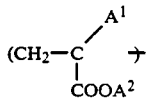

(II)

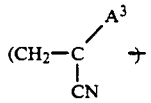

(III)

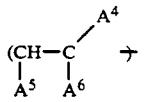

(IV)

wherein $A^1$ represents a hydrogen atom, a methyl group or a halogen atom, $A^2$ represents a substituted or unsubstituted alkyl group or phenyl group, $A^3$ represents a hydrogen atom or a methyl group, $A^4$ represents a hydrogen atom, a methyl group or a —$CH_2COOM$ group, $A^5$ represents a hydrogen atom, a methyl group or a —COOM group, $A^6$ represents a —COOM group or an alkoxycarbonyl group, phenyl group or N-alkylcarbamoyl group which is substituted with a —COOM group, and M represents a hydrogen atom or an alkali metal atom.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOSENSITIVE MATERIAL

FIELD OF THE INVENTION

This invention concerns silver halide photosensitive materials having excellent dimensional stability. Furthermore, the present invention concerns silver halide photosensitive materials comprising a film having improved physical properties, especially with regard to adhesion of the film with the binder.

BACKGROUND OF THE INVENTION

Silver halide photographic materials generally have a layer wherein a hydrophilic colloid such as gelatin, for example, forms a binder on at least one side of a support. Such a hydrophilic colloid layer is disadvantageous in that it is liable to expand and contract in response to changes in humidity and changes in temperature.

The change in dimension of a photosensitive material caused by expansion and contraction of the hydrophilic colloid layer is a very serious disadvantage in the case of a photosensitive material for printing purposes, for example, which is used for the reproduction of screen dot images in multi-color printing or accurate line drawings.

Techniques for obtaining a photosensitive material which exhibits a small variation in dimension, namely, a material having excellent dimensional stability, include techniques wherein the thickness ratio of the hydrophilic colloid layer and the support is specified as disclosed in U.S. Pat. No. 3,201,250, and techniques wherein a polymer latex is included in the hydrophilic colloid layer as disclosed in JP-B-39-4272, JP-B-39-17702, JP-B-43-13482, JP-B-45-5331 and U.S. Pat. Nos. 2,376,005, 2,763,625, 2,772,166, 2,852,386, 2,853,457, 3,397,988, 3,411,911 and 3,411,912. (The term "JP-B" as used herein signifies an "examined Japanese patent publication".) Furthermore, a theoretical discussion regarding the above described techniques is provided by J. Q. Umberger in *Photographic Science and Engineering*, 1957, pages 69–73.

However, the inclusion of a polymer latex in the hydrophilic colloid layer often adversely affects the adhesion of the layer with the substrate, the wear resistance of the film and the film strength in the development processing.

Techniques wherein the above described adverse effects due to the polymer latex are mitigated by using polymers having active methylene groups which react with conventional gelatin film hardening agents are disclosed, for example, in U.S. Pat. Nos. 3,459,790, 3,488,708, 3,554,987, 3,700,456 and 3,939,130, and British Patent 1,491,701. An improvement in dimensional stability to the extent that the film strength and wear resistance in the development processing bath are not lost has been obtained by means of these techniques. However, there is a strong demand for further improvement in dimensional stability in the printing field where multi-color printing and accurate line drawing reproduction is required. Furthermore, a technique for improving dimensional stability of a support wherein both of a polyester film are covered with polyolefin has been proposed in JP-A-60-3627 but this technique is inadequate in practice. (The term "JP-A" as used herein signifies an "unexamined published Japanese patent application".)

Furthermore, methods using hydrazine derivatives for obtaining high contrast photographic characteristics are disclosed, for example, in U.S. Pat. Nos. 4,224,401, 4,168,977, 4,166,742, 4,311,781, 4,272,606, 4,211,857 and 4,243,739.

High speed photographic characteristics of ultra-high contrast can be obtained using the above noted methods, but the contrast enhancing action of the hydrazine derivatives is inhibited by the use of a large amount of polymer latex for increasing dimensional stability. Furthermore, the amount of a polymer latex which can be used is limited because of the adverse effects which limit the high contrast photographic characteristics, and a satisfactory level of dimensional stability has hitherto not been achieved.

The technique in which the thickness ratio of the hydrophilic colloid layer and the support is specified minimizes the expansion and contraction of the unprocessed film and the processed film due to changes in humidity. However, it is not possible using this technique to improve the dimensional stability before and after the photographic processing (development, fixing, washing and drying). Particularly, the support expands as a result of the uptake of water during development processing and the base does not revert to its original size after the drying process, even over a long period of time such that some expansion remains in practice. Hence, on comparing the dimensions of a film in the unprocessed state with those of the processed film, it is often found that the film is expanded in the processed state. In the industry, this phenomenon is recognized as poor dimensional stability which accompanies processing, and is an especially serious disadvantage for photosensitive materials for printing purposes.

The technique of including a polymer latex in the hydrophilic colloid layer can also reduce the extent of the expansion and contraction which occur with changes in humidity, but the disadvantage described above due to the permeation of processing liquids into the support in the processing operation are not thereby avoided.

A technique using a polyester support which has been covered with a vinylidene chloride copolymer in order to alleviate this problem is proposed in JP-A-64-538. This technique is particularly useful for improving the dimensional stability with respect to processing of photosensitive materials for printing purposes, however, it is difficult to obtain an evenly coated film thickness of the vinylidene chloride-containing copolymer such that coating irregularities tend to occur, and in many cases there is an adverse effect on the adhesion between the support and the binder. An effective solution has still not been found in this regard.

The vinilidene chloride-containing copolymer in JP-A-64-538 contains the viniliden chloride in an amount of 70 to 99.5 wt % and does not specify a molecular weight and carboxylic acid content, whereas the vinilidene chloride-containing copolymer of the present invention has core-shell type structure, a molecular weight of 45,000 or larger and contains carboxylic group in shell part.

Moreover, powerful shear forces result between the coated surface and the coating machine and at the one-way valves in the coating liquid feed pumps. Polymer condensates are also produced, and these condensates may have a adverse effect on the coated surface condition. Furthermore, the condensates are necessarily removed from the manufacturing equipment.

SUMMARY OF THE INVENTION

A first object of the present invention is to provide a silver halide photosensitive material having excellent dimensional stability with respect to environmental variations and processing.

A second object of the present invention is to provide a silver halide photosensitive material having excellent dimensional stability with respect to environmental changes and processing, said photosensitive material also having ultra-high contrast using hydrazine derivatives.

A third object of the present invention is to a silver halide photosensitive material having improved adhesion between the support and the binder, and improved film strength and wear resistance in development processing baths, and having excellent dimensional stability with respect to environmental variations and processing.

A fourth object of the present invention is to provide a silver halide photosensitive material wherein the hydrophilic colloid layer is strongly bonded to the polyester film support.

A fifth object of the present invention is to provide a silver halide photosensitive material wherein the coated film thickness and coated surface condition of the vinylidene chloride-containing copolymer are uniform, and wherein the adhesion between the support and the binder are excellent, and wherein the photosensitive material has excellent dimensional stability with respect to environmental variations and processing.

The above described objectives have been achieved by providing a silver halide photosensitive material comprising a polyester film support having thereon at least one hydrophilic colloid layer, at least one layer of which is a silver halide emulsion layer and at least one layer of which is a polymer latex-containing hydrophilic colloid layer, said polyester film support having coated on each side thereof a vinylidene chloride copolymer having a weight average molecular weight of not more than 45,000, said vinylidene chloride a core/shell type latex, said core part containing at least one of each type of repeating unit represented by the formulae (I) and said shell part containing at least one of each type of repeating unit represented by the formulae (I), (III) and (IV):

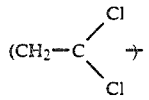
(I)

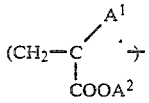
(II)

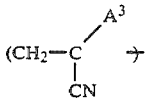
(III)

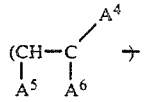
(IV)

wherein $A^1$ represents a hydrogen atom, a methyl group or a halogen atom, $A^2$ represents a substituted or unsubstituted alkyl group or phenyl group, $A^3$ represents a hydrogen atom or a methyl group, $A^4$ represents a hydrogen atom, a methyl group or a —$CH_2COOM$ group, $A^5$ represents a hydrogen atom, a methyl group or a —COOM group, $A^6$ represents a —COOM group or an alkoxycarbonyl group, phenyl group or N-alkylcarbamoyl group which is substituted with a —COOM group, and M represents a hydrogen atom or an alkali metal atom.

DETAILED DESCRIPTION OF THE INVENTION

The vinylidene chloride copolymer of the present invention is a copolymer having a weight average molecular weight of not more than 45,000, preferably not more than 40,000 but at least 3,000, and most desirably not more than 35,000 but at least 6,000. The vinylidene chloride copolymer is prepared by combining at least one of each type of monomer component from which the repeating units represented by the formulae (II)--(IV) are derived from with vinylidene chloride. The vinylidene chloride copolymer may also comprise repeating units derived from other monomer components. The weight average molecular weight is that obtained by calculation as polystyrene using the gel permeation chromatography method.

No particular limitation is imposed upon the molecular weight distribution of the vinylidene chloride copolymer of the present invention, and polymers having a mono-disperse molecular weight distribution, a wide molecular weight distribution or a poly-disperse molecular weight distribution can be used.

The core part of the vinylidene copolymer latex of the present invention preferably constitutes from 60 to 95 wt %, and most desirably for from 70 to 90 wt % of the whole of the latex particles, and the shell part preferably accounts for from 5 to 40 wt %, and most desirably for from 10 to 30 wt %, of the whole of the latex particles.

The proportion (w) of repeating units represented by formula (I) in the whole of the vinylidene chloride copolymer core/shell latex particles is from 70 to 98.5 wt %, preferably from 85 to 97 wt %, and most desirably from 88 to 94 wt %.

The proportion (x) of repeating units represented by formula (II) contained in the whole of the latex particles is from 1.0 to 20 wt %, preferably from 2 to 12 wt %, and most desirably from 5 to 10 wt %.

The proportion (y) of repeating units represented by formula (III) contained in the whole of the latex particles is from 0.1 to 5.0 wt %, preferably from 0.3 to 3.5 wt %, and most desirably from 0.5 to 2.5 wt %. The proportion (z) of repeating units represented by formula (IV) contained in the whole of the latex particles is from 0.05 to 3.0 wt %, preferably from 0.1 to 1.5 wt %, and most desirably from 0.1 to 0.8 wt %.

All proportions (X), (Y) and (Z) of the repeating units are based on the latex as a whole.

In formulae (II)-(IV), A' is preferably a hydrogen atom, a methyl group or a Cl or an F atom, and it is most desirably a hydrogen atom or a methyl group. $A^2$ preferably represents a substituted or unsubstituted alkyl group having from 1 to 6 carbon atoms, and most desirably $A^2$ represents an unsubstituted alkyl group having from 1 to 4 carbon atoms. $A^3$ represents a hydrogen atom or a methyl group. $A^4$ preferably represents a hydrogen atom, a methyl group or a —$CH_2COOH$ group, and most desirably it represents a hydrogen atom or a methyl group. $A^5$ preferably represents a hydrogen atom. $A^6$ preferably represents a —COOH group or an alkoxycarbonyl group or N-alkylcarbamoyl group which is substituted with a —COOH group, and most desirably $A^6$ represents a —COOH group.

Examples of substituent groups for the substituted alkyl phenyl group represented by $A^2$, substituted alkoxy carbonyl group, phenyl group or N-alkylcarbamoyl group represented by $A^6$ include alkoxy group (which may be further substituted), halogen atom, nitro group, cyano group, alkyl group (in the case of a substituted phenyl group), carboxamido group, carbamoyl group, sulfonamido group, sulfamoyl group and sulfo group.

Useful examples of monomers from which the repeating units of formulae (II)-(IV) are derived from are indicated below, but the invention is not limited by these examples.

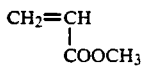
II-1

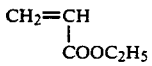
II-2

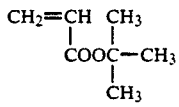
II-3

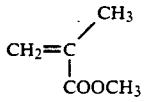
II-4

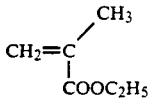
II-5

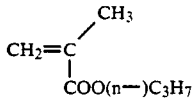
II-6

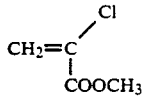
II-7

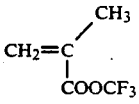
II-8

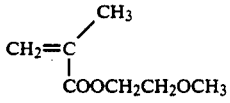
II-9

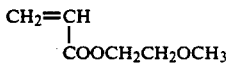
II-10

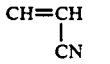
III-1

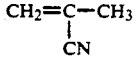
III-2

-continued

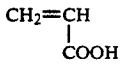
IV-1

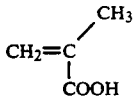
IV-2

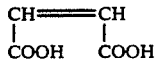
IV-3

(Cis or trans)

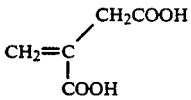
IV-4

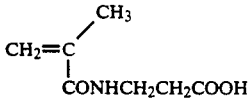
IV-5

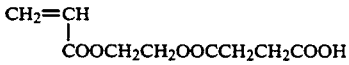
IV-6

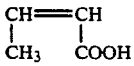
IV-7

Additional useful examples of monomers from which the repeating units represented by formula (II) derived from are indicated below:

n-Propyl acetate, isopropyl acrylate, n-butyl acrylate, 3-acryloylpropanesulfonic acid, acetoxyethyl acrylate, phenyl acrylate, 2-methoxy acrylate, 2-ethoxy acrylate, 2-(methoxyethoxy)ethyl acrylate, 2-methanesulfonamidoethyl acrylate, n-butyl methacrylate, tert-butyl methacrylate, cyclohexyl methacrylate, 2-hydroxyethyl methacrylate, 2-ethoxyethyl methacrylate, dimethylethylamino methacrylate.

Other monomers which can be used to prepare the core part of the vinylidene chloride copolymer of the present invention include, for example, crotonic acid esters, vinyl esters, maleic acid di-esters, fumaric acid di-esters, itaconic acid di-esters, acrylamides, methacrylamides, vinyl ethers and styrenes.

Furthermore, monomers from which the repeating units of formulae (III) and (IV) are derived from may be used to prepare the core part, and monomers from which the repeating unit of formula (II) are derived from may be used to prepare the shell part.

Actual examples of these monomers which can be used to prepare the shell part of the vinylidene chloride copolymer include crotonic acid esters, such as butyl crotonate and hexyl crotonate for example, vinyl esters such as vinyl acetate, vinyl propionate, vinyl butyrate, vinyl methoxyacetate and vinyl benzoate, maleic acid di-esters such as diethyl maleate, dimethyl maleate and dibutyl maleate, fumaric acid di-esters such as diethyl fumarate, dimethyl fumarate and dibutyl fumarate, itaconic acid di-esters such as diethyl itaconate, dimethyl itaconate and dibutyl itaconate, acrylamides such as acrylamide, methylacrylamide, ethylacrylamide, isopropylacrylamide, n-butylacrylamide, hydroxymethylacrylamide, diacetoneacrylamide, acryloylmorpholine and acrylamido-2-methylpropanesulfonic acid, methacrylamides such as methylmethacrylamide, ethylmethacrylamide, n-butylmethacrylamide, tert-butylmethacrylamide, 2-methoxyethylmethacrylamide, dimethylmethacrylamide and diethylmethacrylamide, vinyl ethers such as methyl vinyl ether, butyl vinyl ether, hexyl vinyl ether, methoxyethyl vinyl ether and dimethylaminoethyl vinyl ether, and styrenes such as styrene, methylstyrene, dimethylstyrene, trimethylstyrene, ethylstyrene, isopropylstyrene, butylstyrene, chloromethylstyrene, methoxystyrene, butoxystyrene, acetoxystyrene, chlorostyrene, dichlorostyrene, bromostyrene, vinylbenzoic acid methyl ester, 2-methylstyrene, styrenesulfonic acid, vinylbenzoic acid and trimethylaminomethylstyrene.

Examples of other monomers which can be used to prepare the shell part of the vinylidene chloride copolymer include allyl compounds (for example allyl acetate), vinyl ketones (for example methyl vinyl ketone), vinyl heterocyclic compounds (for example vinylpyrrolidone), unsaturated nitrile compounds (for example acrylonitrile and methacrylonitrile).

Furthermore, monomers which can be used to prepare both shell and core parts and have groups with bond either directly or via a hardening agent with the binder, for example monomers which have an active methylene group, a (poly)hydroxyphenyl group, a sulfinic acid group, an amino group (which may be substituted with alkyl or phenyl groups), an active ester group, an active halogen atom, an active vinyl group or a precursor thereof, an epoxy group or an ethyleneimino group may also be used to prepare the vinylidene chloride copolymer of the present invention.

The vinylidene copolymers of the present invention can be prepared using emulsion polymerization methods. Emulsion polymerization methods include known techniques and methods of preparation based upon the disclosure of, for example, U.S. Pat. Nos. 4,350,622, 4,401,788, 4,446,273 and 4,535,120, JP-A-61-108650, JP-A-62-256871, JP-A-62-246913, JP-A-62-246912, JP-A-57-139136, JP-A-61-236669, and JP-A-57-137109 can be used. The present invention is realized by means of a vinylidene chloride latex wherein a polymer having excellent adhesion and shear stability is distributed in the shell part and wherein a polymer which imparts barrier properties is distributed in the core part, the vinylidene chloride latex being prepared on the basis of the above noted methods (for example, on the basis of the method described in JP-A-62-256871).

The polymer (shell part) having excellent adhesion, etc., of the present invention is obtained using at least one of each type of monomer from which the repeating units represented by each of formulae (I), (III) and (IV) are derived from, and the polymer (core part) which imparts barrier properties is obtained using at least one of each type of monomer from which the repeating units represented by each of formulae (I) and (II) are derived from.

Any anionic, non-ionic, cationic, betaine or polymeric surfactant, or mixtures thereof, may be used as the emulsifying agent for preparing the vinylidene chloride latex of the present invention, but the use of anionic emulsifying agents is preferred. The use of a surfactant containing at least one type of alkylbenzenesulfonate from among the anionic emulsifying agents is especially desirable, including, for example,

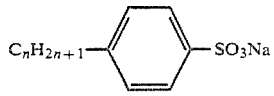

(where n is a positive integer, average value 11–16),

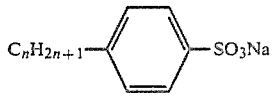

and $C_nH_{2n+1}SO_3Na$ or a mixture of

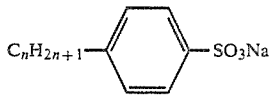

and $C_mH_{2m+1}OSO_3Na$ (m=10, 12, 14, 16 or 18).

Actual examples of the compounds of the present invention are described below, but the compounds of the present invention are not limited by these examples.

SYNTHESIS EXAMPLE 1

Preparation of Compound 1 of the Present Invention

Water (440 ml), 5 grams of sodium alkylbenzenesulfonate and 0.7 gram of sodium persulfate were introduced into a pressure resistant glass reactor and, after displacing the air with nitrogen, a monomer mixture comprising 39 grams of vinylidene chloride and 4.5 grams of methyl methacrylate was introduced with stirring at a temperature of 50° C. After confirming that the reaction had been completed by a reduction in the internal pressure, a monomer mixture comprising 351 grams of vinylidene chloride and 39 grams of methyl methacrylate was introduced. After confirming that the reaction had been completed by a reduction in the internal pressure, a solution obtained by dissolving 0.15 gram of sodium persulfate and 0.075 gram of sodium sulfite in 25 ml of water was introduced into the reactor. Subsequently, a monomer mixture comprising 60 grams of vinylidene chloride, 5 grams of acrylonitrile and 1.75 grams of methacrylic acid was introduced. After confirming that the reaction had been completed by a reduction in the internal pressure, a 10% aqueous sodium alkylbenzenesulfonate solution was added to obtain the desired latex.

The solid fraction concentration was 50.2%, the average particle size was 148 nm and the weight average molecular weight was 23,600.

It was determined by elemental analysis and NMR spectroscopy that compound 1 of the present invention as prepared above had the structure indicated below.

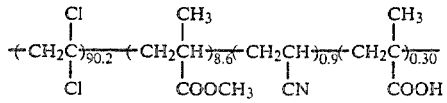

SYNTHESIS EXAMPLE 2

Preparation of Compound 2 of the Present Invention

Water (200 ml), 0.80 gram of sodium hydrogen sulfite and 4.8 gram of sodium alkylbenzenesulfonate (the alkyl group was a mixture with alkyl groups which had 12 carbon atoms as the principal component) were stirred together after displacing the air with nitrogen, 216 grams of vinylidene chloride, 24 grams of methyl methacrylate and an aqueous solution of potassium persulfate (1.9 grams/80 ml) from which the air had been displaced by nitrogen, were added dropwise in a closed system over a period of 12 hours at 55° C. with stirring. After the dropwise addition, the mixture was stirred for an additional period of 3 hours at 55° C. and then 40 more grams of vinylidene chloride, 3 grams of acrylonitrile, 1.5 grams of methacrylic acid and an aqueous solution of potassium persulfate (0.6 gram/20 ml) were added dropwise over a period of 4 hours at 55° C. After the dropwise feeding had been completed, the mixture was stirred for 3 hours at 55° C. and then the unreacted monomer was removed by bubbling nitrogen through the mixture to obtain the desired latex compound.

The solid fraction concentration was 49.8%, the average particle size was 76 nm and the weight average molecular weight was 36,200. Compound 2 of the present invention was determined by elemental analysis and NMR to have the structure indicated below.

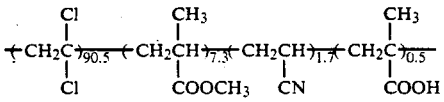

SYNTHESIS EXAMPLE 3

Preparation of Compound 3 of the Present Invention

The desired latex was obtained by changing the emulsifying agent in Synthesis Example 1 from sodium alkylbenzenesulfonate to sodium laurylsulfate. The solid fraction concentration was 49.2%, the average particle size was 83 nm and the weight average molecular weight was 31,000.

Compound 3 of the present invention was determined by elemental analysis and NMR to have the structure indicated below.

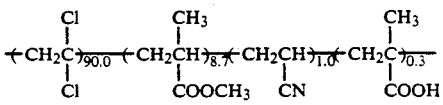

SYNTHESIS EXAMPLE 4

Compounds 4–20 of the present invention were prepared on the basis of Synthesis Examples 1 and 2 having the structure as indicated in the general formula and Table below.

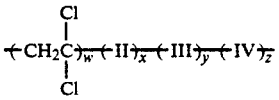

| Compound of the invention | II | III | IV | Other monomer components | Based on example of synthesis | Emulsifying agent used | w/x/y/z (wt %) | Solid fraction concentration | Average particle size | Weight average molecular weight |
|---|---|---|---|---|---|---|---|---|---|---|
| 4 | II-4 | III-2 | IV-1 | — | 1 | $D_1$ | 90.1/8.8/0.9/0.2 | 50.6 | 132 | 32100 |
| 5 | II-4 | III-2 | IV-2 | — | 2 | $D_1$ | 89.8/8.8/1.1/0.3 | 48.8 | 110 | 40700 |
| 6 | II-4 | III-1 | IV-1 | — | 1 | $D_1$ | 91.5/6.8/1.2/0.5 | 49.2 | 128 | 21000 |
| 7 | II-1 | III-1 | IV-2 | — | 2 | $D_2$ | 90.3/8.6/0.8/0.3 | 51.1 | 105 | 38500 |
| 8 | II-1/II-4 (1/3) | III-1 | IV-2 | — | 1 | $D_1$ | 89.7/8.4/1.5/0.4 | 45.5 | 88 | 22200 |
| 9 | II-4 | III-1 | IV-1/IV-2 (1/1) | — | 2 | $D_2$ | 89.0/8.9/1.8/0.3 | 49.7 | 128 | 18000 |
| 10 | II-4 | III-1 | IV-2 | — | 1 | $D_3$ | 90.0/8.7/0.9/0.4 | 49.6 | 139 | 21400 |
| 11 | II-4 | III-1 | IV-2 | — | 2 | $D_1$ - $D_3$ (1/1) | 90.2/8.4/1.0/0.4 | 48.8 | 97 | 27600 |
| 12 | II-4 | III-1 | IV-4 | — | 1 | $D_1$ | 90.5/8.2/1.1/0.2 | 38.8 | 155 | 33900 |
| 13 | II-4 | III-1 | IV-3 | — | 1 | $D_1$ | 90.3/7.6/1.4/0.7 | 42.6 | 146 | 41000 |
| 14 | II-4 | III-1 | IV-6 | — | 1 | $D_3$ | 91.3/6.4/1.3/1.0 | 43.2 | 101 | 31600 |
| 15 | II-4 | III-2 | IV-2 | $CH_2{=}C(CH_3)COOCH{-}CH_2$ (O) | 2 | $D_1$ | 90.7/7.2/1.1/0.5/0.5 | 47.2 | 83 | 15800 |
| 16 | II-2 | III-1 | IV-2 | — | 2 | $D_4$ | 89.8/7.6/1.1/1.5 | 45.8 | 77 | 34100 |
| 17 | II-5 | III-1 | IV-2 | — | 2 | $D_5$ | 89.9/7.3/2.5/0.3 | 43.6 | 78 | 24200 |

-continued

| Compound of the invention | II | III | IV | Other monomer components | Based on example of synthesis | Emulsifying agent used | w/x/y/z (wt %) | Solid fraction concentration | Average particle size | Weight average molecular weight |
|---|---|---|---|---|---|---|---|---|---|---|
| 18 | II-3 | III-1 | IV-2 | — | 1 | $D_6$ | 90.1/7.7/1.7/0.5 | 38.2 | 115 | 33900 |
| 19 | II-6 | III-1 | IV-2 | — | 2 | $D_7$ | 90.7/6.9/1.8/0.6 | 39.6 | 82 | 44000 |
| 20 | II-9 | III-1 | IV-2 | — | 2 | $D_8$ | 91.0/6.0/1.0/2.0 | 40.3 | 85 | 8900 |

In the Table above:
$D_1$: Sodium alkylbenzenesulfonate
$D_2$: Sodium laurylsulfonate
$D_3$: $C_nH_{2n+1}SO_3Na$ $D_4$: 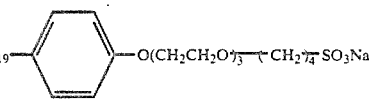

$D_5$: 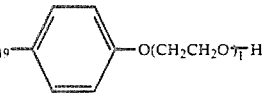 (Where l is from 10 to 50)

$D_6$: 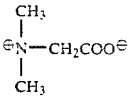

$D_7$: 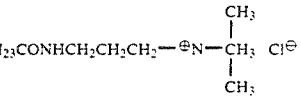

$D_8$: 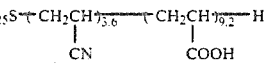

SYNTHESIS EXAMPLE 5

Comparative compounds 101–103 were prepared with half the amount of potassium persulfate as employed in Synthesis Examples 1 and 2.

Comparative Compound 101

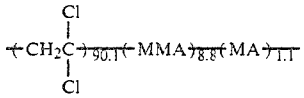

MMA: methyl methacrylate
MA: methyl acrylate

The solid fraction concentration was 48.9%, the average particle size was 89 nm and the weight average molecular weight was 79,600.

Comparative Compound 102

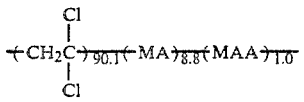

MAA: methacrylic acid
MA: methyl acrylate

The solid fraction concentration was 45.5%, the average particle size was 78 nm and the weight average molecular weight was 58,800.

Comparative Compound 103

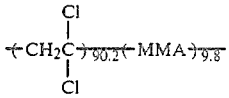

MMA: methyl methacrylate

The solid fraction concentration was 48.3%, the average particle size was 83 nm and the weight average molecular weight was 84,000.

SYNTHESIS EXAMPLE 6

Preparation of Comparative Compound 104

Water (200 ml), 2.8 grams of sodium alkylbenzenesulfonate and 0.75 grams of potassium persulfate were introduced into a closed system. The air was displaced by nitrogen, and a monomer mixture comprising 270 grams of vinylidene chloride, 25 grams of methyl methacrylate, 3.0 grams of acrylonitrile, 1.5 grams of IV-2 and an aqueous solution of sodium hydrogen sulfite (0.65 gram/100 ml) from which the air had been displaced by nitrogen, was added dropwise over a period of 16 hours at 50° C. with stirring. After the drip feed had been completed the mixture was stirred for 2 hours at 50° C., the unreacted monomer was removed by bubbling nitrogen through the mixture, and then an additional 2.0 grams of sodium alkylbenzenesulfonate was added to obtain the desired latex.

The solid fraction concentration was 50.8%, the average particle size was 87 nm and the weight average molecular weight was 68,400. Comparative Compound 104 was determined by elemental analysis and NMR to have the structure indicated below.

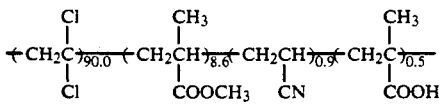

The generally known coating methods, for example dip coating, air knife coating, curtain coating, roller coating, wire bar coating and gravure coating, or the extrusion coating method in which a hopper is used as disclosed in U.S. Pat. No. 2,681,294, for example, can be used for coating the polyester support with a vinylidene chloride copolymer latex of the present invention.

Compounds well known in the industry as hardening agents can be included in the vinylidene chloride copolymer coating liquids of the present invention. For example, use can be made of the triazine based compounds disclosed, for example, in U.S. Pat. Nos. 3,325,287, 3,288,775 and 3,549,377, and Belgium Patent 6,602,226, the dialdehyde based compounds disclosed, for example, in U.S. Pat. Nos. 3,291,624 and 3,232,764, French Patent 1,543,694 and British Patent 1,270,578, the epoxy based compounds disclosed, for example, in U.S. Pat. No. 3,091,537 and JP-B-49-26580, the vinyl based compounds disclosed in U.S. Pat. No. 3,642,486, the aziridine based compounds disclosed in U.S. Pat. No. 3,392,024, the ethyleneimine based compounds disclosed, for example, in U.S. Pat. No. 3,549,378, and methylol based compounds.

The use of triazine based compounds and dialdehyde compounds, and epoxy based compounds from among these hardening agents is preferred.

The addition amount of the hardening agent is from 0.001 to 30 grams per liter of vinylidene chloride copolymer coating liquid.

The thickness of the coated vinylidene chloride copolymer layer of the present invention is preferably greater than that required to suppress the expansion of the base by the uptake of water during development processing operations. However, if the vinylidene chloride copolymer layer is too thick, it will have an adverse effect on the adhesion of the silver halide emulsion layer.

In view of the above considerations, the thickness of the vinylidene chloride copolymer layer is at least 0.3 μm but not more than 5 μm, and preferably at least 0.5 μm but not more than 2.0 μm. The thickness of the films according to the present invention is defined as in a dry state.

The polyester support of the present invention is a polyester prepared from an aromatic dibasic acid and a glycol as the principal components. Typical dibasic acids include terephthalic acid, isophthalic acid, p-β-oxyethoxybenzoic acid, diphenylsulfone di-carboxylic acid, diphenoxyethane dicarboxylic acid, adipic acid, sebacic acid, azelaic acid, 5-sodium sulfo-isophthalic acid, diphenylene dicarboxylic acid, and 2,6-naphthalene dicarboxylic acid. Typical glycols include ethylene glycol, propylene glycol, butanediol, neopentylene glycol, 1,4-cyclohexanediol, 1,4-cyclohexanedimethanol, 1,4-bisoxyethoxybenzene, bis-phenol A, diethylene glycol and polyethylene glycol.

Poly(ethylene terephthalate) is the most desirable of the above described polyesters with respect to commercial availability.

No particular limitation is imposed upon the thickness of the polyester support, but a thickness of from about 12–500 μm, and preferably from about 40–200 μm, is useful with respect to ease of handling and general applicability. The biaxially extended crystallized polyesters are preferred from with respect to stability and strength, for example. A layer which adheres to the above described polymer layer and the emulsion layer can be established as an subbing layer in order to improve the strength of adhesion between the polymer layer and the emulsion layer (JP-A-51-114120 and 50-131516). Furthermore, the surface of the vinilidene chloride-containing copolymer layer may be subjected to a preliminary corona discharge treatment, ultraviolet irradiation treatment or a flame treatment, for example, in order to further improve the adhesion properties.

The hydrophilic colloid layers of the photosensitive material of the present invention are silver halide emulsion layers, backing layers, protective layers and intermediate layers, for example, and a hydrophilic colloid is contained in these layers. Gelatin is the most desirable hydrophilic colloid. Any of the gelatins, such as lime treated gelatin, acid treated gelatin, enzyme treated gelatin and modified gelatin, for example, which are generally used in the industry can be used, but lime treated gelatin and acid treated gelatin are preferred.

Furthermore, use can be made of proteins such as colloidal albumin and casein, cellulose compounds such as carboxymethylcellulose and hydroxyethylcellulose, sugar derivatives such as starch derivatives, sodium alginate and agar, and synthetic hydrophilic colloids such as poly(vinyl alcohol), poly(N-vinylpyrrolidone) poly(acrylic acid) copolymers, polyacrylamide and derivatives and partial hydrolyzates thereof as well a gelatin. Mixtures of two or more of these colloids can be used, as required.

A polymer latex is contained in at least one hydrophilic colloid layer of the present invention. The preferred polymer latexes are aqueous dispersions of water insoluble polymers having a molecular weight of 1,000 to 1,000,000 preferably 50,000 to 500,000 and an average particle size of from 20 mμ to 700 mμ, and the amount used, in terms of the dry weight ratio with the amount of gelatin used as a binder, is from 0.01 to 1.0, and preferably from 0.1 to 0.8 (JP-A-51-130217).

Preferred examples of polymer latexes are indicated below.

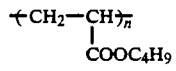

Polymer 1

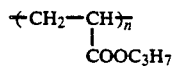

Polymer 2

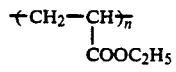

Polymer 3

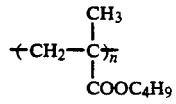

Polymer 4

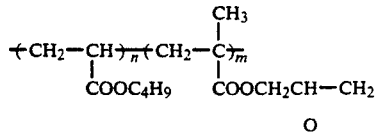

Polymer 5

-continued

Polymer 6

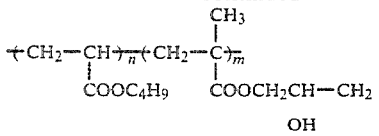

The polymer latex which the present invention is included in at least one hydrophilic colloid layer. For example, the polymer latex may be contained in a silver halide emulsion layer, a backing layer, a protective layer or an intermediate layer.

The present invention is especially effective for preparing an ultra-high contrast sensitive material containing a hydrazine derivative.

Hydrazine derivative containing ultra-high contrast sensitive materials and methods of image formation employing these materials are disclosed, for example, in U.S. Pat. Nos. 4,224,401, 4,168,977, 4,166,742, 4,241,164 and 4,272,606, JP-A-60-83028, JP-A-60-218642, JP-A-60-258537 and JP-A-61-223738.

When a hydrazine derivative is used in the photographic material of the present invention, the hydrazine derivative is added in an amount of $1\times10^{-6}$ to $5\times10^{-2}$ mol/mol-Ag, preferably $1\times10^{-5}$ to $2\times10^{-2}$ mol/mol-Ag into any layer over the support at silver halide emulsion side, such as silver halide emulsion layer, intermediate layer, protective layer, etc., preferably silver halide layer. The hydrazine derivative is preferably a compound represented by the general formula (Q) indicated below.

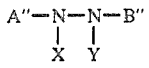

(Q)

In the formula Q, A″ represents an aliphatic group or an aromatic group and B″ represents a formyl group, an acyl group, an alkyl or aryl sulfonyl group, an alkyl or aryl sulfinyl group, a carbamoyl group, an alkoxy or aryloxy carbonyl group, a sulfinamoyl group, an alkoxysulfonyl group, a thioacyl group, a thiocarbamoyl group, a sulfanyl group or a heterocyclic group, and X and Y are either both are hydrogen atoms, or one of X and Y is a hydrogen atom and the other is a substituted or unsubstituted alkylsulfonyl group or a substituted or unsubstituted arylsulfonyl group or a substituted or unsubstituted acyl group.

Useful examples of the hydrazine derivative represented by formula (Q) are indicated below.

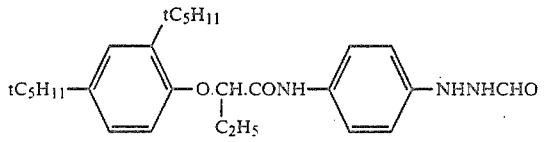

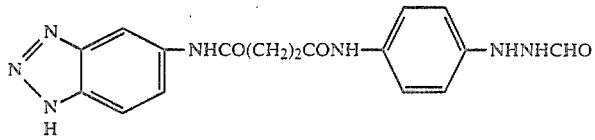

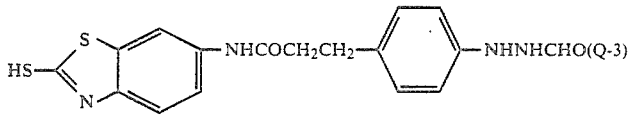

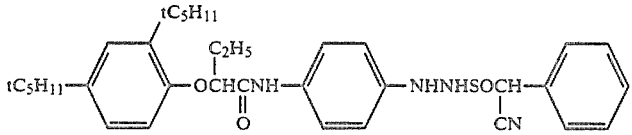

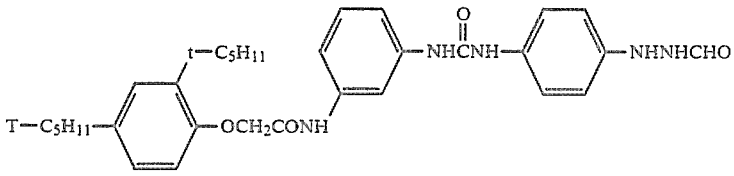

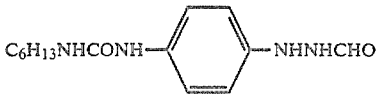

-continued

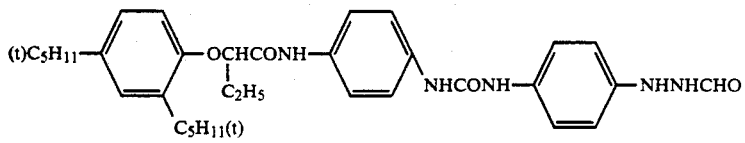

(Q-7)

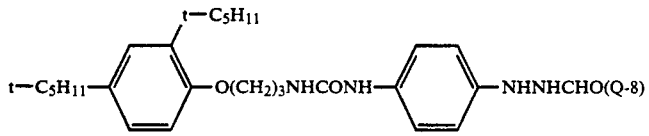

(Q-8)

Moreover, the present invention is effective when the photosensitive material contains a tetrazolium compound and is subjected to high contrast processing using PQ type or MQ type developers which contain comparatively high concentrations of sulfite in which PQ type developers comprises developing agents of pyrazolone and hydroquinone, and MQ type comprises agents of methol and hydroquinone. Methods of image formation using tetrazolium compounds are disclosed, for example, in JP-A-52-18317, JP-A-53-17719 and JP-A-53-17720.

The silver halide emulsion for use in the photosensitive material of the present invention are generally prepared by mixing a solution of a water soluble silver salt (for example silver nitrate) and a solution of a water soluble halogen salt (for example potassium bromide) in the presence of a water soluble polymer solution such as a gelatin solution.

Silver chloride, silver bromide, silver chlorobromide, silver iodobromide and silver chloroiodobromide can all be used as the silver halide, and no particular limitation is imposed on the form of the grains or the grain size distribution.

The silver halide emulsion layer can contain photosensitive silver halide, chemical sensitizers, spectral sensitizers, anti-foggants, hydrophilic colloids (especially gelatin), hardening agents such as gelatin hardening agents, surfactants for improving the physical properties of the film, and thickeners, for example. Reference can be made to the disclosures of *Research Disclosure,* Vol. 176, Item 17643 (December 1978), and in JP-A-52-108130, JP-A-52-114328, JP-A-52-121321, JP-A-53-3217 and JP-A-53-44025 in connection with these materials.

The surface protective layer has a thickness of from 0.3 to 3 μm, and preferably from 0.5 to 1.5 μm and contains a hydrophilic binder such as gelatin. The surface protective layer may contain matting agents such as fine particles of poly(methyl methacrylate), colloidal silica and, as required thickeners such as poly(potassium styrenesulfonate), gelatin hardening agents, surfactants, slip agents and UV absorbers, for example.

Examples of useful gelatin hardening agents include chrome salts, aldehydes (for example formaldehyde and glutaraldehyde), N-methylol compounds (for example dimethylolurea), active vinyl compounds (for example, 1,3,5-triacryloyl-hexahydro-s-triazine, bis(vinylsulfonyl)methyl ether, N,N,-methylenebis-[β-(vinylsulfonyl)propionamide]), active halogen compounds (for example, 2,4-dichloro-6-hydroxy-s-triazine), mucohalogen acids (for example, mucochloric acid), N-carbamoylpyridinium salts (for example, (1-morpholinocarbonyl-3-pyridinio)methanesulfonate) and haloamidinium salts (for example, 1-(1-chloro-1-pyridinomethylene)pyrrolidinium 2-naphthalenesulfonate), and these compounds can be used individually or in combination. From among the above described compounds, the use of the active vinyl compounds disclosed in JP-A-53-41220, JP-A-53-57257, JP-A-59-162546 and JP-A-60-80846, and the active halogen compounds disclosed in U.S. Pat. No. 3,325,287 are preferred.

The backing layer is a non-photosensitive layer containing a hydrophilic colloid such as gelatin as a binder. The backing layer may have a single layer structure or a multi-layer structure including intermediate and protective layers, for example.

The thickness of the backing layer is from 0.1 to 10 μm, and as in the silver halide emulsion and surface protective layers the backing layer may contain gelatin hardening agents, surfactants, matting agents, colloidal silica, slip agents, UV absorbers, dyes and thickeners, for example.

The present invention can be applied to a variety of photographic materials which have hydrophilic colloid layers, and generally is useful with photographic materials employing silver halide as the photosensitive component including, for example, photosensitive materials for printing purposes, photosensitive materials for X-ray purposes, general negative photosensitive materials, general reversal photosensitive materials, general positive photosensitive materials and direct positive photosensitive materials. The effect of the present invention is especially pronounced when used in a photosensitive material for printing purposes.

No particular limitation is imposed on the methods of exposing and developing the photosensitive materials of the present invention, and reference can be made to the disclosures of, for example, JP-A-52-108130, JP-A-52-114328 and JP-A-52-121321, and the above noted Research Disclosure in this connection.

In accordance with a preferred embodiment of the present invention, a silver halide photosensitive material having excellent dimensional stability with respect to environmental fluctuations and excellent dimensional stability with respect to processing is obtained by arranging a hydrophilic colloid containing a polymer latex on at least one side of a polyester support, while covering both sides of the support with a vinylidene chloride copolymer comprising a core/shell type latex having an average molecular weight of not more than 45,000.

Furthermore, in accordance with a second preferred embodiment of the present invention, a silver halide photosensitive material having excellent adhesion between the vinylidene chloride copolymer layer and the support and especially between the vinylidene chloride copolymer layer and the adjoining binder layer, is obtained by including repeating unit derived from a monomer having functional groups which bond either directly or via a film hardening agent with the binder in the vinylidene chloride copolymer.

The invention is described in detail below by means of illustrative examples, but the invention is not limited by these examples.

EXAMPLE 1

The under-layer 1 and the under-layer 2 indicated below were both coated in order from the support onto each side of a biaxially extended poly(ethylene terephthalate) support of thickness 100 μm to prepare undercoated supports 1011–110.

| (1) Under-layer 1 Formulation | |
|---|---|
| Vinylidene chloride latex (of the type indicated in Table 1) | 15 parts by weight |
| 2,4-Dichloro-6-hydroxy-s-triazine, sodium salt | 0.15 part by weight |
| Fine polystyrene particles (average particle size 2.5 μm) | Added to provide a coated weight of 80 mg/m$^2$ |
| Distilled water | Added to make a total of 100 parts by weight |

After adjusting to pH 6 by adding 10% KOH, the coating liquid was coated onto the support to provide a dry film thickness as indicated in Table 1 and dried for 2 minutes at 185° C.

| (2) Under-layer 2 Formulation | |
|---|---|
| Gelatin | 1 part by weight |
| Methyl cellulose | 0.05 part by weight |
| $HO-[C(=O)-(CH_2)_4-C(=O)-NH(CH_2)_2-N(CH_2CHOHCH_2Cl)-(CH_2)_2-NH]_4-HCl$ | 0.02 part by weight |
| $C_{12}H_{25}O(CH_2CH_2O)_{10}H$ | 0.03 part by weight |
| Distilled water | 98.9 parts by weight |

This coating liquid was coated to provide a dry film thickness of 0.1 μm and dried for 2 minutes at 170° C. to provide an undercoated support.

The backing layer 1 (electrically conductive layer) and the protective layer 2 were coated in order from the support onto a first side of the undercoated support. The silver halide emulsion layer 1, the silver halide layer 2, the protective layer 2 and the protective layer 3 were coated in order from the support onto the second side of the support to provide samples 101–110.

| (1) Backing Layer 1 Formulation (Electrically Conductive Layer) | |
|---|---|
| $SnO_2/Sb$ (9/1 by weight, average particle size 0.25 μm) | 300 mg/m$^2$ |
| Gelatin | 170 mg/m$^2$ |
| Compound 1 | 7 mg/m$^2$ |

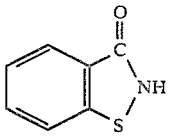

| | |
|---|---|
| Sodium dodecylbenzenesulfonate | 10 mg/m$^2$ |
| Sodium dihexyl-α-sulfosuccinate | 40 mg/m$^2$ |
| poly(styrenesulfonic acid), sodium salt | 9 mg/m$^2$ |
| (2) Protective Layer 2 Formulation | |
| Gelatin | 2.9 mg/m$^2$ |
| Compound 2 | 300 mg/m$^2$ |

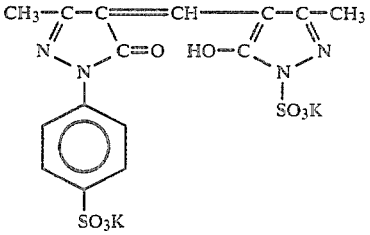

-continued

Compound 3 — 50 mg/m²

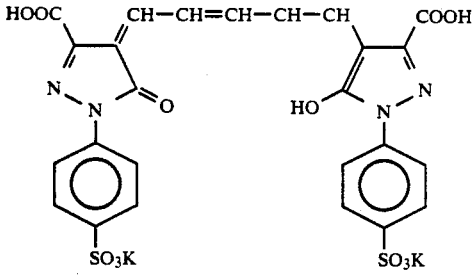

Compound 4 — 50 mg/m²

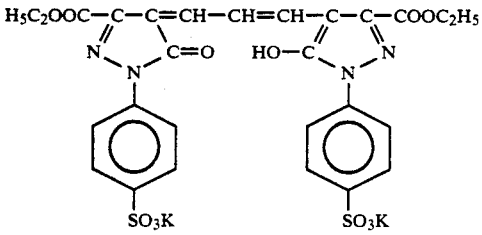

| | |
|---|---|
| Compound 1 | 10 mg/m² |
| Sodium dodecylbenzenesulfonate | 70 mg/m² |
| Sodium dihexyl-α-sulfosuccinate | 15 mg/m² |
| 1,3-Divinylsulfonyl-2-propanol | 150 mg/m² |
| Ethyl acrylate latex (average particle size 0.05 μm) | 500 mg/m² |
| Potassium perfluorooctanesulfonate | 10 mg/m² |
| Finely powdered silicon dioxide powder (average particle size 3.5 μm, pore diameter 170 Å, surface area 300 m²/gram) | 35 mg/m² |

(3) Silver Halide Emulsion

Layer 1 Formulation

| | |
|---|---|
| Liquid I: | Water 300 ml, Gelatin 9 grams |
| Liquid II: | $AgNO_3$ 100 grams, Water 400 ml |
| Liquid III: | NaCl 37 grams, $(NH_4)_3RhCl$ 1.1 mg, Water 400 ml |

Liquids II and III were added at the same time and at a fixed rate to liquid I, the temperature of which was maintained at 45° C. After removing the soluble salts using a the normal method well known in the industry, gelatin was added to the emulsion and 6-methyl-4-hydroxy-1,3,3a,7-tetra-azaindene was added as a stabilizer. This emulsion was a mono-disperse emulsion of average grain size 0.20 μm, and the gelatin content was 60 grams per kg of emulsion recovered.

The compounds indicated below were added to the emulsion thus obtained.

| | |
|---|---|
| Compound 5 | $6 \times 10^{-3}$ mol/mol · Ag |
| Compound 6 | 60 mg/m² |
| Compound 7 | 9 mg/m² |
| Compound 1 | 10 mg/m² |
| Poly(styrenesulfonic acid), sodium salt | 50 mg/m² |
| N-Oleoyl-N-methyltaurine, sodium salt | 40 mg/m² |
| 1,2-Bis(vinylsulfonylacetamido)ethane | 70 mg/m² |
| 1-Phenyl-5-mercaptotetrazole | 3 mg/m² |
| Ethyl acrylate latex (average particle size 0.05 μm) | 0.46 g/m² |

The coating liquid thus obtained was coated to provide a coated silver weight of 2.0 g/m².

Compound 5

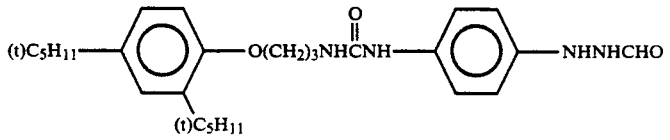

-continued

Compound 6

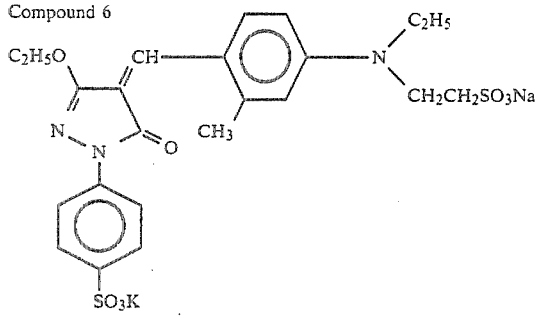

Compound 7

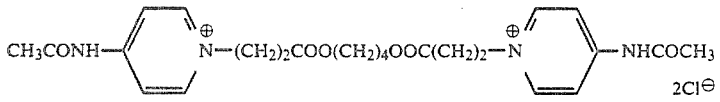

(4) Silver Halide Emulsion Layer 2 Formulation

| | |
|---|---|
| Liquid I: | Water 300 ml, Gelatin 9 grams |
| Liquid II: | $AgNO_3$ 100 grams, Water 400 ml |
| Liquid III: | NaCl 37 grams, $(NH_4)_3RhCl$ 2.2 mg, Water 400 ml |

An emulsion was prepared by adding liquids II and III at the same time to liquid I using the same procedure as for the emulsion of formulation (3). This emulsion was a mono-disperse emulsion of average grain size 0.20 μm.

The compounds and emulsified dispersion of a hydrazine derivative indicated below were added to the emulsion obtained.

| | |
|---|---|
| Emulsified dispersion of hydrazine derivative | $5 \times 10^{-3}$ mol/mol · Ag (as Compound 5) |
| Compound 6 | 60 mg/m$^2$ |
| Compound 7 | 9 mg/m$^2$ |
| Compound 1 | 10 mg/m$^2$ |
| Poly(styrenesulfonic acid), sodium salt | 50 mg/m$^2$ |
| N-Oleoyl-N-methyltaurine, sodium salt | 40 mg/m$^2$ |
| 1,2-Bis(vinylsulfonylacetamido)ethane | 80 mg/m$^2$ |
| 1-Phenyl-5-mercaptotetrazole | 3 mg/m$^2$ |
| Ethyl acrylate latex (average particle size 0.05 μm) | 0.40 g/m$^2$ |

The coating liquid thus obtained was coated in to provide a coated silver weight of 1.3 g/m$^2$.

(5) Protective Layer 2 Formulation

| | |
|---|---|
| Gelatin | 1.0 g/m$^2$ |
| α-Lipoic acid | 10 mg/m$^2$ |
| Sodium dodecylbenzenesulfonate | 5 mg/m$^2$ |
| Compound 6 | 40 mg/m$^2$ |
| Compound 8 | 20 mg/m$^2$ |
| Poly(styrenesulfonic acid), sodium salt | 10 mg/m$^2$ |
| 1-Phenyl-5-mercaptotetrazole | 5 mg/m$^2$ |
| Compound 9 | 20 mg/m$^2$ |
| Ethyl acrylate latex (average particle size 0.05 μm) | 200 mg/m$^2$ |

Compound 8

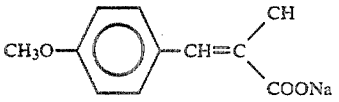

Compound 9

-continued

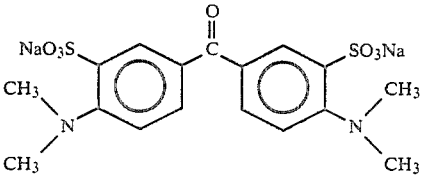

(6) Protective Layer 3 Formulation

| | |
|---|---|
| Gelatin | 1.0 g/m$^2$ |
| Finely powdered silicon dioxide particles (average particle size 3.5 μm, pore diameter 25 Å, surface area 700 m$^2$/gram) | 50 mg/m$^2$ |
| Liquid paraffin (gelatin dispersion) | 43 mg/m$^2$ |
| Sodium dodecylbenzenesulfonate | 20 mg/m$^2$ |
| Potassium perfluorooctanesulfonate | 10 mg/m$^2$ |
| N-Perfluorooctanesulfonyl-N-propylglycine, potassium salt | 3 mg/m$^2$ |
| Poly(styrenesulfonic acid), sodium salt | 2 mg/m$^2$ |
| Sodium salt of the sulfate ester of poly-(degree of polymerization 5)-oxy-ethylene nonyl phenyl ether | 20 mg/m$^2$ |
| Colloidal silica (particle size 15 mμ) | 20 mg/m$^2$ |

Method for the Preparation of an Emulsified Dispersion of a Hydrazine Derivative used in the silver halide emulsion layer 2

| Liquid I | |
|---|---|
| Compound 5 | 3.0 grams |
| Compound 10 | 1.5 grams |
| Poly(N-tert-butylacrylamide) | 6.0 grams |
| Ethyl acetate | 30 ml |
| Sodium dodecylbenzenesulfonate (72% methanol solution) | 0.12 gram |
| Water | 0.12 ml |

A uniform solution of Liquid I was prepared by heating to 65° C.

| Liquid II | |
|---|---|
| Gelatin | 12 grams |
| Compound 1 | 0.02 gram |

-continued

| Liquid II | |
|---|---|
| Water | 108 ml |

A uniform solution of Liquid II was prepared by heating to 65° C.

Liquid I and liquid II were mixed together and stirred at high speed in a homogenizer (made by Nippon Seiki Seisakujo) to obtain a fine particle emulsified dispersion was obtained. The ethyl acetate was removed from this emulsion by heating under reduced pressure distillation, after which water was added to make a total of 250 grams. The residual ethyl acetate content was 0.2%.

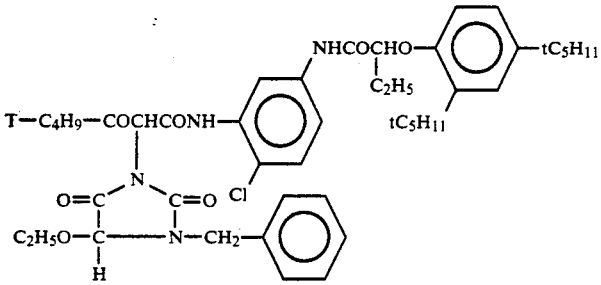

Compound 10

The samples thus obtained were stored for 2 weeks at 25° C., 60% RH and were then evaluated in terms of the change in dimension during processing, dry adhesion properties and wet adhesion properties as described below.

Method of Evaluating the Change in Dimension During Processing

Two holes of diameter 8 mm were made with a spacing of 200 mm in the sample and, after storage at 25° C., 30% RH, the distance between the two holes was measured precisely using a pin gauge of 1/1000 mm accuracy. The length of the first measurement was taken to be X mm. Next, the sample was developed, fixed, washed with water for 20 seconds at 25° C. and dried for about 1 minutes in an automatic processor. The dimension was again measured 5 minutes after the completion of processing. The length of the second measurement was taken to be Y mm. The fractional change in dimension (%) on processing is reported herein as $[(Y-X)/200]\times 100$.

It is recognized in the industry that a fractional change in dimension within ±0.01% is acceptable in practice.

The development and fixing processing were each carried out for 20 seconds at 38° C. in an FG-660 automatic processor made by the Fuji Photographic Film Co. using GR-D1 developer and GR-F1 fixer made by the same company. The drying temperature was 45° C.

Method of Evaluating Adhesion

Seven longitudinal and transverse cuts were made with a razor in the surface of a sample which had been equilibrated for 3 days at 25° C. and 55% RH to form a pattern of 36 squares. Sticky tape (Nitto Tape, made by Nitto Denki Kogyo Co,) was then adhered over the surface of the sample and pulled off rapidly in a direction of 180°. Using the above procedure, those samples wherein the unpeeled part was 95% or more of the total surface area were classified as being of grade A, those samples wherein the remaining part was 90% or more but less than 95% were classified as being of grade B, those samples wherein the remaining part was 60% or more but less than 90% were classified as being of grade C, and those samples wherein the remaining part was less than 60% were classified as being of grade D. An adhesive strength of practical value and satisfactory for durability is that classified as being grade A.

Method of Evaluating Adhesion When Wet

Scratches in the form of a cross were made using a pencil on the emulsion surface of the film in the processing bath during each of the stages of development, fixing and water washing. The crosses were then rubbed five times with the tip of a finger with about the same degree of applied pressure, and the strength of adhesion was assessed by the maximum width off peeling.

For samples where there was no peeling of the emulsion layer beyond the cut, the material was classified as being of grade A. For samples where the maximum width of peeling was within 2 mm, the material was classified as being of grade B. For samples where the maximum width of peeling was within 5 mm, the material was classified as being of grade C. All other samples were classified as being of grade D. A strength of adhesion sufficiently durable in practice for a photographic sensitive material is that classified as grade A among the four levels of assessment indicated above.

Moreover, the development processing was carried out under the conditions indicated below.

| | |
|---|---|
| Development GR-D1 (made by Fuji Photographic Film Co.) | 38° C., 20 seconds |
| Fix GR-F1 (made by Fuji Photographic Film Co.) | 38° C., 20 seconds |
| Water Wash | 25° C., 20 seconds |

The results of these evaluations are shown in Table 1 below. It is clearly seen that the samples of the present invention provide remarkably superior dry adhesion properties.

TABLE 1

| Sample Number | Vinylidene Chloride Latex | Thickness of First Under-Layer (μm) (%) | Change in Dimensions on Processing | Adhesion When Dry | Adhesion When Wet |
|---|---|---|---|---|---|
| 101 (Invention) | Prep. Compound 1 | 0.3 | 0.010 | A | A |

TABLE 1-continued

| Sample Number | Vinylidene Chloride Latex | Thickness of First Under-Layer (μm) (%) | Change in Dimensions on Processing | Adhesion When Dry | Adhesion When Wet |
|---|---|---|---|---|---|
| 102 (Invention) | As Above | 0.4 | 0.009 | A | A |
| 103 (Invention) | As Above | 0.5 | 0.009 | A | A |
| 104 (Invention) | As Above | 0.7 | 0.007 | A | A |
| 105 (Invention) | As Above | 0.9 | 0.006 | A | A |
| 106 (Invention) | Prep. Compound 2 | 0.9 | 0.007 | A | A |
| 107 (Invention) | Prep. Compound 3 | 0.9 | 0.006 | A | A |
| 108 | Comparative Compound 101 | 0.9 | 0.007 | D | A |
| 109 | Comparative Compound 102 | 0.9 | 0.006 | C | A |
| 110 | Comparative Compound 103 | 0.9 | 0.006 | D | A |

EXAMPLE 2

Undercoated supports 201–210 were prepared in the same way as in example 1 except that the type of vinylidene chloride latex used in the first under-layer was changed as shown in Table 2 below.

A silver halide emulsion layer and a protective layer 1 were coated in order from a first side of the support of the undercoated supports 201–210, and a backing layer and the protective layer 2 were coated in order the second side of the support to prepare samples 201–210.

| | |
|---|---|
| Liquid I: | Water 300 ml, gelatin 9 grams |
| Liquid II: | $AgNO_3$ 100 grams, water 400 ml |
| Liquid III: | NaCl 37 grams, $(NH_4)_3RhCo_6$ 0.6 gram, water 400 ml |

Liquids II and III were added at the same time and at a fixed rate to liquid I which was maintained at 40° C. After removing the soluble salts using a flocculation method well known in the industry, gelatin was added to the emulsion and 6-methyl-4-hydroxy-1,3 3a, 7-tetra-azaindene and 4-hydroxy-5,6-trimethylene-1,3,3a,7-tetra-azaindene were added as stabilizers. The resulting emulsion was a mono-disperse emulsion of average grain size 0.15 μm, and the gelatin content was 60 grams per kg of emulsion recovered.

The compounds indicated below were added to the emulsion thus obtained.

5 mg/m²

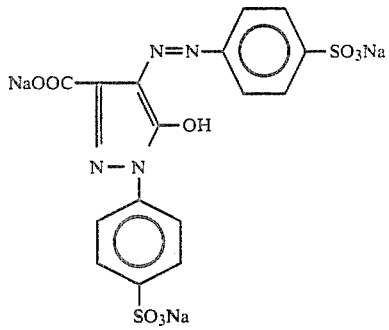

| | |
|---|---|
| Poly(styrenesulfonic acid), sodium salt | 10 mg/m² |
| 1,2-Bis(vinylsulfonylacetamido)ethane | 100 mg/m² |
| Ethyl acrylate latex (average particle size 0.1 μm) | 500 mg/m² |

0.3 mg/m²

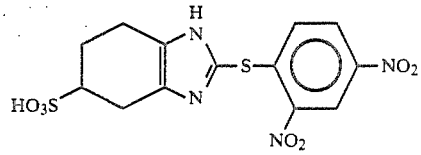

The coating liquid obtained in this way was coated as to provide a coated silver weight of 3 g/m²

(2) Protective Layer 1 Formulation 5 mg/m²

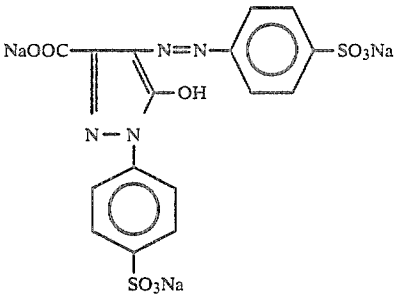

| | |
|---|---|
| Sodium dodecylbenzenesulfonate | 25 mg/m² |
| Sodium dihexyl-α-sulfosuccinate | 10 mg/m² |
| N-Perfluorooctanesulfonyl-N-propyl-glycine, potassium salt | 2 mg/m² |
| Poly(styrenesulfonic acid), sodium salt | 3 mg/m² |
| Ethyl acrylate latex (average particle size 0.1 μm) | 200 mg/m² |
| Colloidal silica | 350 mg/m² |
| Lipoic acid | 8 mg/m² |

-continued

| | |
|---|---|
| (3) Backing Layer Formulation | |
| Gelatin | 2 g/m$^2$ |
| 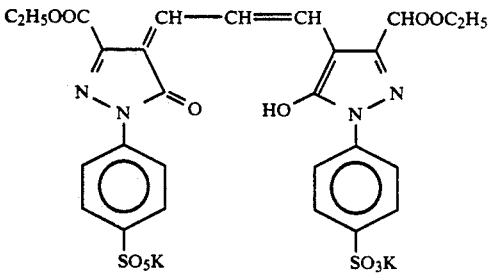 | 30 mg/m$^2$ |
| 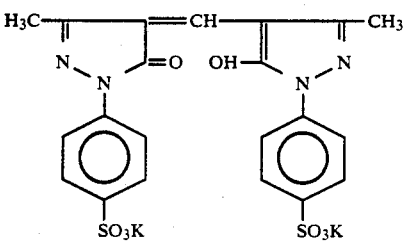 | 180 mg/m$^2$ |
| 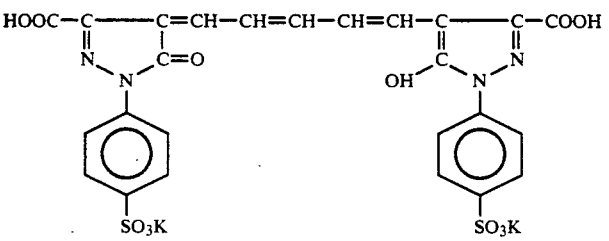 | 50 mg/m$^2$ |
| Sodium dihexyl-α-sulfosuccinate | 20 mg/m$^2$ |
| Sodium dodecylbenzenesulfonate | 30 mg/m$^2$ |
| Poly(styrenesulfonic acid), sodium salt | 30 mg/m$^2$ |
| 1,3-Divinylsulfonyl-2-propanol | 100 mg/m$^2$ |
| Ethyl acrylate latex (average particle size 0.1 μm) | 200 mg/m$^2$ |
| (4) Protective Layer 2 Formulation | |
| Gelatin | 1 g/m$^2$ |
| Fine poly(methyl acrylate) particles as used in the emulsion protective layer | 40 mg/m$^2$ |
| Sodium dihexyl-α-sulfosuccinate acid | 10 mg/m$^2$ |
| Sodium dodecylbenzenesulfonate | 30 mg/m$^2$ |
| Poly(styrenesulfonic acid), sodium salt | 25 mg/m$^2$ |
| Sodium acetate | 30 mg/m$^2$ |

The completed samples were stored for 2 weeks at 25° C., 60% RH and were evaluated in the same way as described in Example 1.

The results obtained are shown in Table 2.

TABLE 2

| Sample Number | Vinylidene Chloride Latex | Thickness of First Under-Layer (μm) (%) | Change in Dimensions on Processing | Adhesion When Dry | Adhesion When Wet |
|---|---|---|---|---|---|
| 201 (Invention) | Prep. Compound 4 | 0.3 | 0.010 | A | A |
| 202 (Invention) | As Above | 0.4 | 0.009 | A | A |
| 203 (Invention) | As Above | 0.5 | 0.009 | A | A |
| 204 (Invention) | As Above | 0.7 | 0.007 | A | A |
| 205 (Invention) | As Above | 0.9 | 0.005 | A | A |
| 206 (Invention) | Prep. Compound 6 | 0.9 | 0.006 | A | A |
| 207 (Invention) | Prep. Compound 8 | 0.9 | 0.006 | A | A |
| 208 | Comparative Compound 101 | 0.9 | 0.005 | D | A |
| 209 | Comparative Compound 102 | 0.9 | 0.005 | C | A |
| 210 | Comparative Compound 103 | 0.9 | 0.005 | D | A |

EXAMPLE 3

Undercoated supports 301–310 were prepared in the same way as in Example 1 except that the type of vinylidene chloride latex used in the first under-layer was changed as indicated in Table 3.

A silver halide emulsion layer, a protective layer 1 and a protective layer 2 were coated in order from the support on a first side of the undercoated supports 301–310. A backing layer and a protective layer 3 were also coated in order from the support onto the second side of the support to prepare samples 301–310.

(1) Silver Halide Emulsion Laver Formulation

An aqueous solution of silver nitrate and an aqueous solution of sodium chloride containing $1.3\times10^{-4}$ mol per mol·Ag of the ammonium salt of hexachlororhodium(III) acid were added at the same time over a period of 10 minutes to an aqueous gelatin solution maintained at 35° C. By controlling the potential to 200 mV, monodisperse cubic silver chloride grains of average particle size 0.08 μm were obtained. After grain formation, the soluble salts were removed using a flocculation method well known in the industry, and then 4-hydroxy-6-methyl-1,3,3a,7-tetra-azaindene and 1-phenyl-5-mercaptotetrazole were added in an amount of $5\times10^{-3}$ mol/mol-Ag and $5\times10^{-4}$ mol/mol-Ag respectively, as stabilizers.

The compound represented by (Q-1) below was added to the emulsion in an amount of $1\times10^{-3}$ mol/mol·Ag, and the compound represented by (Q-2) below was added in an amount of $1\times10^{-4}$ mol/mol·Ag.

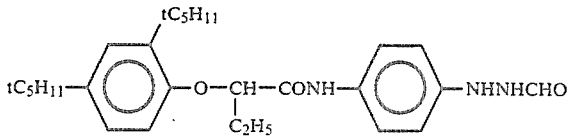

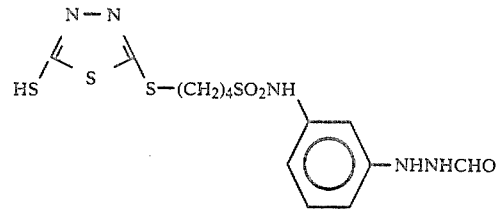

Moreover, poly(ethyl acrylate) was added in an amount of 50 wt % with respect to the gelatin as a solid fraction, and 35 mg/m² of the compound indicated below and 145 mg/m² of 2-bis(vinylsulfonylacetamido)ethane as a hardening agent were added.

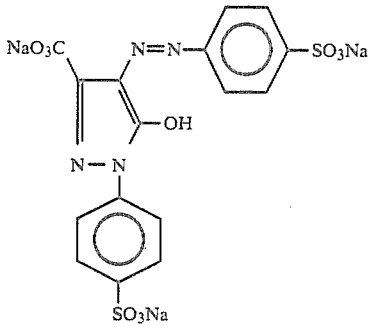

35 mg/m²

(2) Protective Layer 1 Formulation

| | |
|---|---|
| Gelatin | 1 g/m² |
| Thioctic acid | 6 mg/m² |

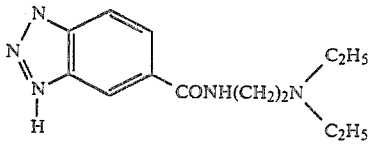

90 mg/m²

| | |
|---|---|
| 1,5-Dihydroxy-2-benzaldoxime | 35 mg/m² |
| Sodium dodecylbenzenesulfonate | 10 mg/m² |
| Poly(styrenesulfonic acid), sodium salt | 20 mg/m² |
| Ethyl acrylate latex (average particle size 0.05 μm) | 0.2 g/m² |

(3) Protective Layer 2 Formulation

| | |
|---|---|
| Gelatin | 0.6 g/m² |

-continued

| | |
|---|---|
| 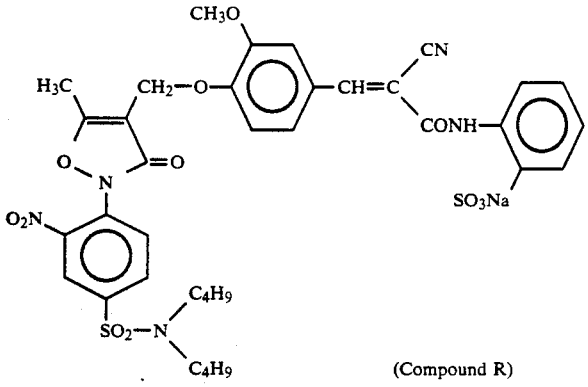 (Compound R) | 0.1 g/m$^2$ |
| Fine poly(methyl methacrylate particles (average particle size 2.5 μm) | 20 mg/m$^2$ |
| Fine silicon dioxide particles (average particle size 2.8 μm) | 30 mg/m$^2$ |
| N-Perfluorooctanesulfonyl-N-propyl-glycine, potassium salt | 3 mg/m$^2$ |
| Sodium dodecylbenzenesulfonate | 20 mg/m$^2$ |
| Hydroquinone | 150 mg/m$^2$ |

Moreover, the compound R was added after forming a gelatin dispersion using the procedure indicated below.

A solution obtained by dissolving 18.9 grams of compound R in 25 ml of N,N-dimethylsulfamide was mixed with agitation at 45° C. with 536 grams of a 6.5 wt % aqueous solution of gelatin to which 13 grams of compound S had been added to obtain the gelatin.

| | |
|---|---|
| $C_{11}H_{23}CONH(CH_2)_3\overset{\oplus}{N}(CH_3)_2(CH_3)_2(CH_2)_4\overset{\ominus}{SO_3}$ (Compound S) | |
| (4) Backing Layer Formulation | |
| Gelatin | 2.5 g/m$^2$ |
| 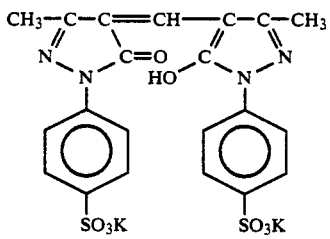 | 0.26 g/m$^2$ |
| 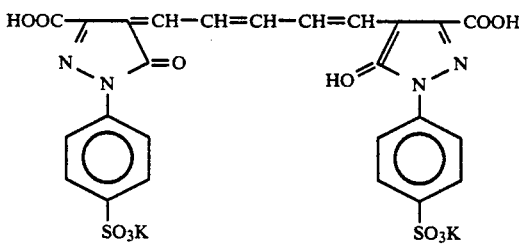 | 30 mg/m$^2$ |
| 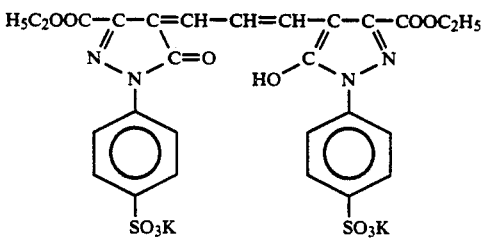 | 40 mg/m$^2$ |

-continued

| | |
|---|---|
| $C_{11}H_{23}CONH(CH_2)_3\overset{\oplus}{N}(CH_3)_2(CH_3)_2(CH_2)_4\overset{\ominus}{SO_3}$ (Compound S) | 90 mg/m$^2$ |
| 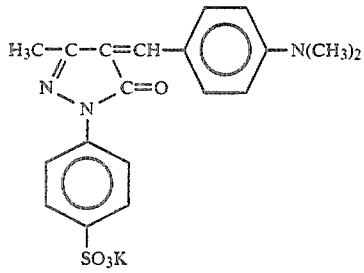 | |
| Sodium dihexyl-α-sulfosuccinate | 30 mg/m$^2$ |
| Sodium dodecylbenzenesulfonate | 35 mg/m$^2$ |
| 1,3-Divinylsulfonyl-2-propanol | 130 mg/m$^2$ |
| Ethyl acrylate latex (average particle size 0.05 μm) | 0.5 g/m$^2$ |
| (5) Protective Layer 3 Formulation | |
| Gelatin | 0.8 g/m$^2$ |
| Fine poly(methyl methacrylate) particles (average particle size 3.4 μm) | 40 mg/m$^2$ |
| Sodium dihexyl-α-sulfosuccinate | 9 mg/m$^2$ |
| Sodium dodecylbenzenesulfonate | 10 mg/m$^2$ |
| Sodium acetate | 40 mg/m$^2$ |

The samples 301–310 thus obtained were stored for 2 weeks at 25° C., 60% RH and then evaluated in the same way as described in Example 1. The results obtained are shown in Table 3.

TABLE 3

| Sample Number | Vinylidene Chloride Latex | Thickness of First Under-Layer (μm) (%) | Change in Dimensions on Processing | Adhesion When Dry | Adhesion When Wet |
|---|---|---|---|---|---|
| 301 (Invention) | Prep. Compound 15 | 0.3 | 0.009 | A | A |
| 302 (Invention) | As Above | 0.4 | 0.008 | A | A |
| 303 (Invention) | As Above | 0.5 | 0.007 | A | A |
| 304 (Invention) | As Above | 0.7 | 0.007 | A | A |
| 305 (Invention) | As Above | 0.9 | 0.006 | A | A |
| 306 (Invention) | Prep. Compound 16 | 0.9 | 0.005 | A | A |
| 307 (Invention) | Prep. Compound 20 | 0.9 | 0.006 | A | A |
| 308 | Comparative Compound 101 | 0.9 | 0.006 | D | A |
| 309 | Comparative Compound 102 | 0.9 | 0.005 | C | A |
| 310 | Comparative Compound 103 | 0.9 | 0.005 | D | A |

EXAMPLE 4

Undercoated supports 401–410 were prepared in the same way as in Example 1 except that the type of vinylidene chloride latex used in the first under-layer was changed as indicated in Table 4 below.

A silver halide emulsion layer and a protective layer 1 were coated in order from the support on a first side of the undercoated supports 401–410. A backing layer and a protective layer 2 were coated in order from the support onto the second side of the support to prepare samples 401–410.

(1) Silver Halide Emulsion Layer Formulation

An aqueous solution of silver nitrate and a mixed aqueous solution of sodium chloride and potassium bromide were added at the same time over a period of 30 minutes and at a fixed rate in the presence of $2\times10^5$ mol/mol·Ag of rhodium chloride to an aqueous gelatin solution which was maintained at 50° C. A mono-disperse silver chlorobromide emulsion of average grain size 0.2 μm (Cl composition 95 mol %) was thus obtained.

The resulting emulsion was de-salted using a flocculation method, and then 1 mg/mol·Ag of thiourea dioxide and 0.6 mg/mol·Ag of chloroauric acid were added. The emulsion was ripened at 65° C. to attain maximum performance and the extent of fogging was controlled.

The compounds indicated below were also added to the emulsion.

| | |
|---|---|
| 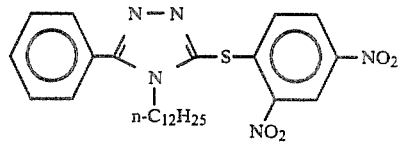 | $2\times10^{-2}$ mol/mol.Ag |
| 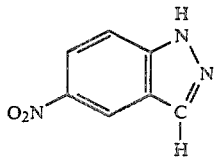 | $1\times10^{-3}$ mol/mol.Ag |

-continued

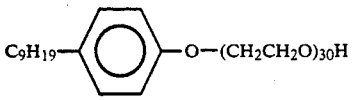

$4 \times 10^{-4}$ mol/mol.Ag

-continued

| | |
|---|---|
| KBr | 20 mg/m$^2$ |
| Poly(styrenesulfonic acid), sodium salt | 40 mg/m$^2$ |
| 2,6-Dichloro-6-hydroxy-1,3,5-triazine, sodium salt | 30 mg/m$^2$ |

This coating liquid was coated to provide a coated silver weight of 3.5 g/m$^2$.

(2) Protective Layer 1 Formulation

| | |
|---|---|
| Gelatin | 1.5 g/m$^2$ |
| Fine $SiO_2$ particles (average particle size 4 μm) | 50 mg/m$^2$ |
| Sodium dodecylbenzenesulfonate | 50 mg/m$^2$ |

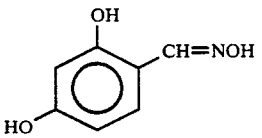

20 mg/m$^2$

| | |
|---|---|
| 5-Nitroindazole | 15 mg/m$^2$ |
| 1,3-Divinylsulfonyl-2-propanol | 50 mg/m$^2$ |
| N-Perfluorooctanesulfonyl-N-propylglycine, potassium salt | 2 mg/m$^2$ |
| Ethyl acrylate latex (average particle size 0.1 μm) | 300 mg/m$^2$ |

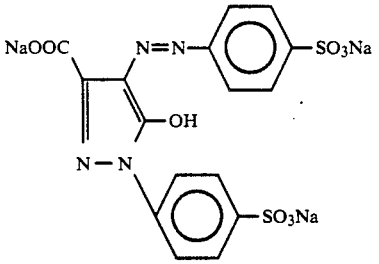

100 mg/m$^2$ (3) Backing Layer Formulation

| | |
|---|---|
| Gelatin | 2.5 g/m$^2$ |

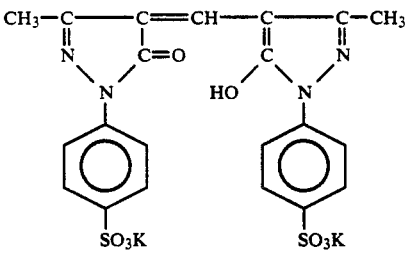

30 mg/m$^2$

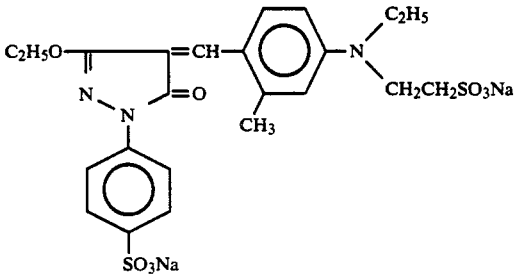

140 mg/m$^2$

-continued

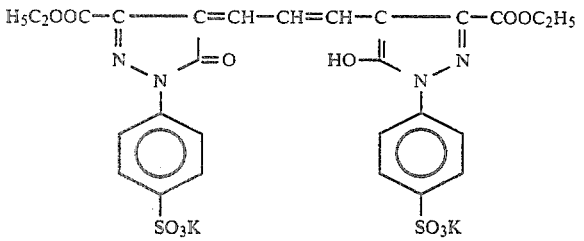

40 mg/m²

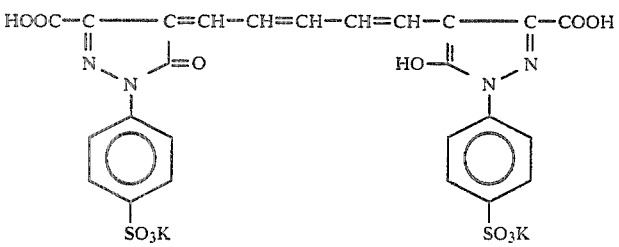

80 mg/m²

| | |
|---|---|
| 1,3-Divinylsufonyl-2-propanol | 150 mg/m² |
| Ethyl acrylate latex (average particle size 0.1 μm) | 900 mg/m² |
| Sodium dihexyl-α-sulfosuccinate | 35 mg/m² |
| Sodium dodecylbenzenesulfonate | 35 mg/m² |
| (4) Protective Layer 2 Formulation | |
| Gelatin | 0.8 g/m² |
| Fine poly(methyl methacrylate) particles (average particle size 3 μm) | 20 mg/m² |
| Sodium dihexyl-α-sulfosuccinate | 10 mg/m² |
| Sodium dodecylbenzenesulfonate | 10 mg/m² |
| Sodium acetate | 40 mg/m² |

The finished samples were stored for 2 weeks at 25° C. and 60% RH, and were evaluated in the same way as described in Example 1. The results are shown in Table 4.

TABLE 4

| Sample Number | Vinylidene Chloride Latex | Thickness of First Under-Layer (μm) (%) | Change in Dimensions on Processing | Adhesion When Dry | Adhesion When Wet |
|---|---|---|---|---|---|
| 401 (Invention) | Prep. Compound 12 | 0.3 | 0.010 | A | A |
| 402 (Invention) | As Above | 0.4 | 0.009 | A | A |
| 403 (Invention) | As Above | 0.5 | 0.008 | A | A |
| 404 (Invention) | As Above | 0.7 | 0.007 | A | A |
| 405 (Invention) | As Above | 0.9 | 0.005 | A | A |
| 406 (Invention) | Prep. Compound 14 | 0.9 | 0.005 | A | A |
| 407 (Invention) | Prep. Compound 17 | 0.9 | 0.005 | A | A |
| 408 | Comparative Compound 101 | 0.9 | 0.006 | D | A |
| 409 | Comparative Compound 102 | 0.9 | 0.005 | C | A |
| 410 | Comparative Compound 103 | 0.9 | 0.006 | D | A |

While the invention has been described in detail and with reference to specific embodiments thereof, it will be apparent to one skilled in the art that various changes and modifications can be made therein without departing from the spirit and scope thereof.

What is claimed is:

1. A silver halide photosensitive material comprising a polyester film support having thereon at least one hydrophilic colloid layer, at least one layer of which is a silver halide emulsion layer and at least one layer of which is a polymer latex containing hydrophilic colloid layer, said polyester film support having coated on each side thereof a vinylidene chloride copolymer having a weight average molecular weight not more than 45,000, said vinylidene chloride copolymer being a core/shell type latex, said core part containing at least one of each type of repeating unit represented by formulae (I) and (II) and the said shell part containing at least one of each type of repeating unit represented the formulae (I), (III) and (IV):

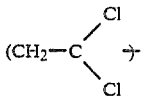

(I)

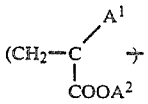

(II)

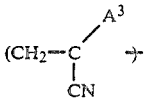

(III)

-continued

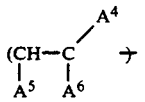

(IV)

wherein $A^1$ represents a hydrogen atom, a methyl group or a halogen atom, $A^2$ represents a substituted or unsubstituted alkyl group or phenyl group, $A^3$ represents a hydrogen atom or a methyl group, $A^4$ represents a hydrogen atom, a methyl group or a $—CH_2COOM$ group, $A^5$ represents a hydrogen atom, a methyl group or a —COOM group, $A^6$ represents a —COOM group or an alkoxycarbonyl group, phenyl group or N-alkylcarbamoyl group which is substituted with a —COOM group, and M represents a lithium, sodium, potassium or hydrogen atom.

2. A silver halide photosensitive material as in claim 1, wherein the vinylidene chloride copolymer has a weight average molecular weight of from 3,000 to 40,000.

3. A silver halide photosensitive material as in claim 1, wherein the proportion of repeating units represented by formula (I) contained in the whole of the vinylidene chloride copolymer core/shell latex particles is from 70 to 98.5 wt %.

4. A silver halide photosensitive material as in claim 1, wherein the proportion of repeating units represented by formula (II) contained in the whole of the vinylidene chloride copolymer core/shell latex particles is from 1.0 to 20 wt %.

5. A silver halide photosensitive material as in claim 1, wherein the proportion of repeating units represented by formula (III) contained in the whole of the vinylidene chloride copolymer core/shell latex particles is from 0.1 to 5.0 wt %.

6. A silver halide photosensitive material as in claim 1, wherein the proportion of repeating units represented by formula (IV) contained in the whole of the vinylidene chloride copolymer core/shell latex particles is from 0.05 to 3.0 wt %.

7. A silver halide photosensitive material as in claim 1, wherein the shell part of the vinylidene chloride copolymer contains repeating units derived from monomer components having an active methylene group, a (poly)hydroxy phenyl group, a sulfonic acid group, an amino group, an active ester group, an active halogen atom, an active vinyl group or precursor thereof, an epoxy group or an ethyleneimino group.

8. A silver halide photosensitive material as in claim 1, wherein a coating liquid of the vinyliene chloride copolymer contains a hardening agent in an amount of from 0 001 to 30 grams per liter.

9. A silver halide photosensitive material as in claim 1, wherein the vinylidene chloride copolymer layer as coated on each side of the support has a thickness of from 0.3 μm to 5 μm.

10. A silver halide photosensitive material as in claim 1, wherein the polymer latex-containing hydrophilic colloid layer contains gelatin, and the polymer latex is contained in an amount of from 0.01 to 0.1 in terms of the dry weight ratio with the amount of gelatin contained in the same layer.

* * * * *